(12) United States Patent
Le Floch et al.

(10) Patent No.: US 11,355,087 B2
(45) Date of Patent: Jun. 7, 2022

(54) METHOD FOR IMPROVING THE READING OF GRAPHICAL AND TEXT CONTENT

(71) Applicants: Université de Rennes 1, Rennes (FR); Albert Le Floch, Rennes (FR)

(72) Inventors: Albert Le Floch, Rennes (FR); Guy Ropars, Rennes (FR)

(73) Assignees: Université de Rennes 1, Rennes (FR); Albert Le Floch, Rennes (FR)

( * ) Notice: Subject to any disclaimer, the term of this patent is extended or adjusted under 35 U.S.C. 154(b) by 0 days.

(21) Appl. No.: 16/764,737

(22) PCT Filed: Aug. 3, 2018

(86) PCT No.: PCT/FR2018/052010
§ 371 (c)(1),
(2) Date: May 15, 2020

(87) PCT Pub. No.: WO2019/097127
PCT Pub. Date: May 23, 2019

(65) Prior Publication Data
US 2021/0183340 A1    Jun. 17, 2021

(30) Foreign Application Priority Data
Nov. 17, 2017 (FR) ..................... 1701192

(51) Int. Cl.
*G09G 5/30*     (2006.01)
*G09B 17/00*    (2006.01)

(52) U.S. Cl.
CPC ............. *G09G 5/30* (2013.01); *G09B 17/003* (2013.01); *G09G 2310/061* (2013.01); *G09G 2310/08* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,181,300 B1 * | 1/2001 | Poon | G09G 5/12 345/213 |
| 10,191,545 B1 * | 1/2019 | Laszlo | G06T 11/60 |
| 2005/0259064 A1 * | 11/2005 | Sugino | G09G 3/342 345/102 |

(Continued)

FOREIGN PATENT DOCUMENTS

| | | |
|---|---|---|
| EP | 2339842 | 6/2011 |
| WO | WO2014110553 | 7/2014 |

OTHER PUBLICATIONS

French Search Report for French Application No. FR1701192 dated Jul. 3, 2018.

(Continued)

*Primary Examiner* — Joni Hsu
(74) *Attorney, Agent, or Firm* — Patterson Thuente Pedersen, P.A.

(57) ABSTRACT

A method for displaying graphical content in a playback device (DISP), the graphical content being displayed and erased periodically on the display device according to successive cycles that take place at a predetermined frequency (Fd) and in that the successive display periods each have a duration (T1) comprised in an interval of values ranging from 15 to 30% of the duration (T) of the cycles that have taken place.

10 Claims, 1 Drawing Sheet

(56) References Cited

U.S. PATENT DOCUMENTS

| | | | | |
|---|---|---|---|---|
| 2011/0157158 A1* | 6/2011 | Hasegawa | ............. | G02B 30/24 |
| | | | | 345/419 |
| 2013/0147857 A1* | 6/2013 | Kurikko | .................. | G09G 3/20 |
| | | | | 345/690 |
| 2014/0196097 A1 | 7/2014 | Touret et al. | | |
| 2014/0344839 A1 | 11/2014 | Woods et al. | | |

OTHER PUBLICATIONS

Written Opinion and International Search Report for PCT/FR2018/052010 dated Oct. 29, 2018.

* cited by examiner

METHOD FOR IMPROVING THE READING OF GRAPHICAL AND TEXT CONTENT

RELATED APPLICATIONS

This present application is a National Phase entry of PCT Application No. PCT/FR2018/052010 filed Aug. 3, 2018 which claims priority to French Application No. 1701192 filed Nov. 17, 2017 the contents of each being incorporated herein by reference in their entireties.

TECHNICAL FIELD

The present invention relates to a method for displaying a graphical content, representing in particular text elements. More particularly, embodiments of the invention relate to a method for displaying that improves the reading of content, in particular text content, for persons subject to dyslexia.

BACKGROUND

Dyslexia is commonly defined as a set of reading disorders that appear in childhood. It entails specific learning disorders of which the causes appear complex and have been and still are the object of many studies in varied fields.

It is generally excluded to consider that the causes of dyslexia can be solely of a sensory, social or psychological nature.

Studies conducted in the field of neurosciences make it possible to think that it could be a specific neurological disorder.

The progress made in the field of medical imagery has made it possible to reveal the role of certain zones of the brain in the processes of reading and mastering language.

The solutions provided for treating the disorders of dyslexia are based on entertaining work and activities according to the difficulties that are specific to each subject. The objective of such an accompaniment is to provide the subject object of the disorder autonomy in terms of reading. The known methods are developed around work in fields such as psychology, psychomotricity and orthoptics, for example.

Recently, studies have been conducted, that establish a correlation between the particularities specific to the mechanism of vision and the presence of specific disorders of dyslexia. The publication "Left-right asymmetry of the Maxwell spot centroids in adults without and with dyslexia (Le Floch A, Ropars G. 2017, Proc. R. Soc. B 284: 20171380, http://dx.doi.org/10.1098/rspb.2017.1380) mentions the role of foveas, located in the human eye, in the construction of the images perceived, at the cerebral level, and the fact that identical or substantially identical characteristics for the two eyes of the same subject result in the subject in malfunctions in the process of vision and in the phonological treatment at the cerebral level. The transmission of a mirror image from one hemisphere to the other, for example, substantially disturbs the process of reading graphical elements or text content in subjects that have characteristic disorders of dyslexia. Disorders linked to an instability in the fixing and/or a posturologic instability, or binocular convergence defects linked to the oculomotor muscles, can cause visual clutter such as the mirror effect.

SUMMARY

Embodiments of the invention make it possible to improve at least some of the disadvantages of the prior art by proposing a method of displaying a graphical content in a content playback device. The method proposed comprises an alternation of display periods, during which all or a portion of the graphical content is displayed, and periods of absence of display, during which the graphical content is not displayed, according to successive cycles that take place at a predetermined frequency Fd. Each cycle has a duration T and comprises a display period of duration T1 followed or preceded by a non-display period of duration T2. The duration T1 is comprised in an interval of values ranging from 15 to 30% of the duration T of the cycles.

According to an embodiment of the invention, the predetermined frequency Fd is defined by a user of a device that implements the method for displaying according to the invention.

According to an embodiment of the invention, the predetermined frequency is comprised in an interval of values ranging from 60 to 90 Hz, thanks to a system that can be tuned then operating as an anti-visual clutter device.

The method implemented takes advantage of the Hebbian mechanisms in the neurons of the cortex. Advantageously, using a range of frequencies starting from 60 Hz makes it possible to overcome the effects of blinking that can be perceived by the human eye, the limit of perception of blinking by the eye is at around 60 Hz, for humans (without regard, animal species and insects).

According to an embodiment of the invention, the predetermined frequency is selected discretely, i.e. from among a plurality of predetermined frequencies in the interval of frequencies mentioned hereinabove.

According to an alternative of the embodiment, the frequency Fd varies over time, in order to further facilitate, in certain cases, the erasing of the visual clutter and binocular stability.

According to an embodiment, the frequency Fd varies by increasing in successive steps to a maximum value according to a first speed, referred to as the increase speed, then varies by decreasing in successive steps to a minimum value according to a second speed, referred to as the decrease speed, with the increasing and decreasing variations repeating iteratively over time.

According to an embodiment, the decrease speed is equal to the increase speed.

According to an embodiment, the successive steps are of equal duration.

According to an embodiment, the successive steps vary in duration in such a way that the value of the frequency Fd changes according to a triangle, saw-tooth or sinusoid waveform between the maximum value and the minimum value.

According to an embodiment of the invention, the duration T1 of the display periods varies over time.

Embodiments of the invention also relate to a display device that comprises a module for playing back graphical content configured to alternate display periods, during which all or a portion of the graphical content is displayed, and periods of absence of display, during which the graphical content is not displayed, according to successive cycles that take place at a predetermined frequency. Each cycle has a duration T and comprises a display period of duration T1 followed or preceded by a non-display period of duration T2. According to embodiments of the invention, the display device is furthermore configured so that the duration T1 of the display periods is comprised in an interval of values ranging from 15 to 30% of the duration T of the cycles.

According to an embodiment of the invention, the predetermined frequency of the cycles alternating display and non-display periods is comprised in an interval of values ranging from 60 to 90 Hz.

Embodiment of the invention also relate to a computer program comprising program code instructions to execute the steps of the method described hereinabove when this program is executed on a computer. "Computer" here means any playback device comprising a control unit and means for displaying a received or memorized content, such as, in terms of non-limiting examples, a screen, a television, a tablet, a fixed or portable computer, a smartphone, a smart watch, a head-mounted display.

According to embodiments of the invention, the alternation of display and non-display periods of the graphical content to be represented allows for a "focus" of the brain of a subject looking at this graphical content displayed, on an image that represents the displayed content, then, a disappearance of this same image from the view of the subject before it is transmitted in the form of a mirror image between one cerebral hemisphere and the other cerebral hemisphere of this subject looking at the content played back. The delay required for the brain to transmit an image, perceived by the eye, between one hemisphere and the other hemisphere, in the form of a mirror image for the latter, is about 10 ms. Thus, the brain favors the image transmitted with respect to the mirror image thereof, and the confusion that exists in the subject who has a strong similarity of the characteristics of their two foveas, is less or substantially reduced for the reading of the graphical content, in particular when this content is representative of one or more text content.

Advantageously, using a switch configured to selectively display a graphical content according to an "ordinary" method for displaying (permanent display of the graphical content) or according to a method for displaying that implements embodiments of the present invention (alternation of display and non-display periods) allows a user subject to dyslexic disorders to compare their usual performance in reading/viewing (obtained with the ordinary display) with their performance obtained under control of the method for displaying according to embodiments of the invention after optional optimisation of their own parameters (frequency and duty cycle parameters that allow the user to obtain better viewing comfort).

BRIEF DESCRIPTION OF THE DRAWINGS

The invention shall be better understood, and other particularities and advantages shall appear when reading the following description of embodiments of the invention, with the description referring to the accompanying drawings among which.

DETAILED DESCRIPTION

Figure 1:
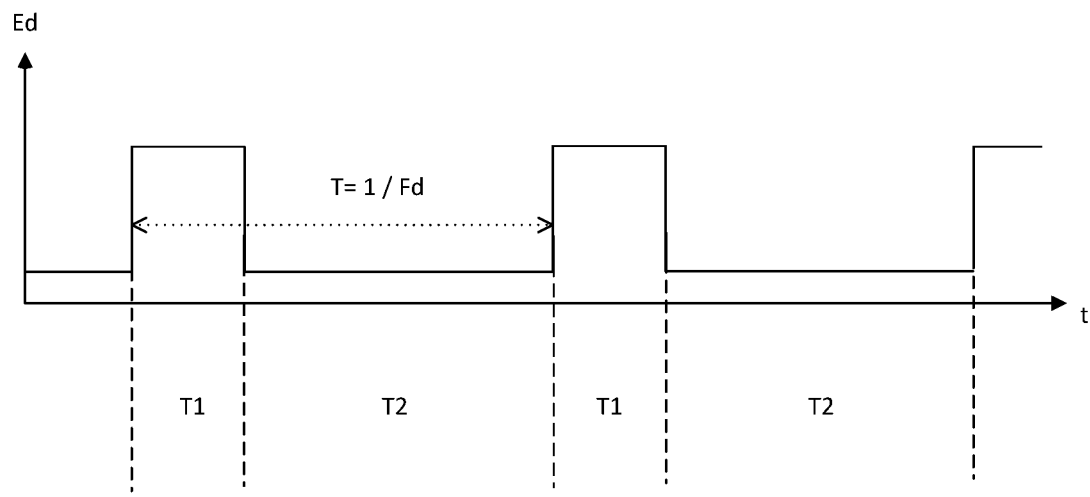
FIG. 1 is a block diagram of a display control signal Ed according to a particular and non-limiting embodiment of the invention.

FIG. 1 is a temporal representation of a control signal Ed for displaying and erasing a content to be represented, in a display device (for playing back content), according to a particular and non-limiting embodiment of the invention. The signal Ed varies according to the time t and periodically takes two successive states. According to the preferred embodiment, an assertion of the signal Ed in the high state authorises the displaying of a graphical content on a playback element of a display device DISP and erases, prevents or inhibits the display of the graphical content considered when the signal Ed is in the low state. The signal Ed is a periodical signal of a predetermined frequency Fd such that $Fd=1/(T1+T2)$. T1 is the activation period of the signal, which is the display period of the pattern in the display device and T2 is the period, referred to as non-display, during which the signal is inactive, or in other terms the period during which the graphical content is erased or the display thereof is inhibited or prevented. "Graphical content" is to be interpreted here as any content to be represented and formed from basic elements such as, for example pixels, in such a way that the content represents elements of varied forms and in particular one or more text contents constructed from signs or symbols from one or more alphabets.

Thus a text content corresponds to a content that can be interpreted in one or more languages, able to be read and interpreted by a subject, user, positioned in such a way as to look at the display device for a reading or viewing operation. Such a device is, for example, a playback screen, a computer, a tablet touch sensitive or not, a smartphone, a smart watch, a digital book device, a device for guiding or assisting in the circulation of vehicles or of pedestrians, with the list of these examples being of course non-exhaustive.

According to a preferred embodiment of the invention, the duty cycle $T1/(T1+T2)$ between the display and non-display periods, respectively of durations T1 and T2, has a value comprised between 15% and 30% of the cycle and the frequency Fd of the variation in the signal Ed is comprised between 60 Hz and 90 Hz.

Preferably, the frequency of the signal is equal to 70 Hz or 84 Hz and the duty cycle $T1/(T1+T2)$ is equal to 20%.

Advantageously, the control signal can easily be forced in a prolonged manner in its state associated with a display, which corresponds to a stopping of the method for displaying according to embodiments of the invention. It would thus be possible to not implement the method for displaying according to the invention in the case where, for a non-dyslexic subject, a visual discomfort would appear.

Advantageously, it is possible to refine the adjusting of the frequency Fd in the interval of values described with the purpose of adapting the period T to the sensitivity of a user of the content playback device DISP, in the range of frequencies indicated. Indeed, each individual has their own sensitivity in terms of vision and perceives more or less variations in display frequency. Thus, a fine adjusting can be made available to the user through an adjustment button, a cursor, implemented by hardware or via a graphical user interface (graphical elements of a menu, for example).

Figure 2:
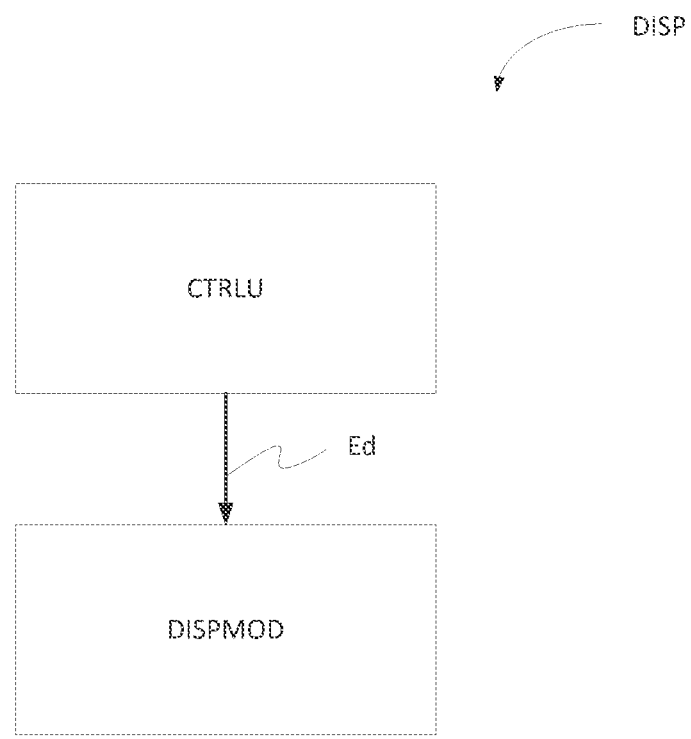
FIG. 2 is a structural representation of the architecture of a display device DISP according to a particular and non-limiting embodiment of the invention.

FIG. 2 is a structural representation of a display device DISP according to a particular and non-limiting embodiment of the invention. This figure shows the global architecture of the content playback device DISP, more commonly called a display device. The device DISP comprises two main modules which are a control unit CTRLU and a display module DISPMOD. The control unit CTRLU is the core of the system in terms of control and conventionally comprises one or more microcontrollers connected to volatile and non-volatile storage memories. The volatile memories are mainly used for all the operations useful in implementing the global system, such as the execution of one more software or hardware drivers. Of course the control unit CTRLU comprises all the usual elements implemented in such an architecture, such as, in terms of examples, a power supply, one or more reset circuits, a power supply monitoring circuit, a power interface, one or more clock circuits, digital and analogue input/output ports, one or more temperature sensors, a mass storage unit (hard drive, flash memory or an evolution of these components), interrupt inputs, wired or wireless communication ports, etc. The list of these elements is not exhaustive. The architectural details of the control unit DISP are not described any further in that the latter are not useful in understanding the invention.

The display module DISPMOD is a graphics controller adapted for representing one or more graphical and text contents on a screen, touch sensitive or not, from data representative of this content, stored in a display memory. The display memory can contain several graphics plans, that can be superimposed on the display. Thus, for example, a graphics plan P1 can be contained in a zone M1 of the display memory, a plan P2 can be contained in a zone M2 of the display memory, and the display module DISPMOD can control the display of the plan P1 and of the plan P2 independently of one another, while still being able to represent them simultaneously by complete or partial superposition when the two plans P1 and P2 are activated simultaneously.

The display memory can be specific to the module DISPMOD or included in the data memory of the control unit CTRLU. All the architectural details of the control unit DISP are not described here in that the latter are not useful in understanding the invention. It is the capacity to inhibit the display of one or more graphics plans, under software or hardware control, and according to the method described, that is important to advantageously allow the brain of a subject to favor an image rather than the mirror image thereof, perceived from the display device DISP implementing the method according to embodiments of the invention. Advantageously, this makes it possible to consequently assist the reading and the decrypting of text content, in a subject that has dyslexic disorders.

Advantageously, the control unit CTRLU comprises as output a display control (or validation) signal Ed, connected to the input of the display module DISPMOD, making it possible to temporarily validate or inhibit the displaying of one or more graphics plans (P1, P2).

Thus, when the signal is activated by positioning in the high state (for example), the displaying of the plane in correspondence, or of all the plans according to the current configuration, is activated. Inversely, when the signal Ed is positioned in the inactive state thereof (low state, for example), the displaying of the graphics plan in correspondence, or of all the graphics plans according to the configuration, is inhibited. This corresponds to a "non-display" phase of the graphical content (disappearance of the content for a subject looking at the device DISP.

In other terms, the variations in the display control signal Ed, that take place by the control unit CTRLU, at a frequency Fd, can act on the playback of a graphical content in such a way that this graphical content is displayed and inhibited (not displayed) periodically on the display device DISP according to successive cycles of a total length T and taking place at a predetermined frequency Fd. According to embodiments of the invention, the successive display periods T1 each have a duration comprised in an interval of values ranging from 15 to 30% of the duration T of the cycles that have taken place.

According to an alternative embodiment of the invention, the control signal Ed can be integrated into the graphics controller which has its own control unit and being configured to validate and inhibit the display of a content according to the method described (alternation of display and non-display at the frequency indicated hereinabove and with a duty cycle such as mentioned hereinabove).

The frequency Fd of the cycles (with each one comprising an opening period of the vision space and a closing period of the vision space) is comprised between 60 and 90 Hz.

According to an embodiment, the frequency Fd is fixed.

According to another embodiment, the frequency Fd varies over time.

According to a particular embodiment, the frequency Fd varies by increasing in successive steps to a maximum value according to a first speed, referred to as the increase speed, then varies by decreasing in successive steps to a minimum value according to a second speed, referred to as the decrease speed, with the increasing and decreasing variations repeating iteratively over time.

According to a particular embodiment, the decrease speed is equal to the increase speed.

According to a particular embodiment, the successive steps are of equal durations.

According to another particular embodiment, the successive steps vary in duration in such a way that the value of the frequency Fd changes according to a triangle, saw-tooth or sinusoid waveform between the maximum value and the minimum value.

Advantageously the duration T1 of the display periods varies over time by changing continuously or discontinuously between limit values ranging from 15 to 30% of the duration T of the cycles. "Continuously" here means a change in increments of successive steps of equal durations.

The phenomenon of wobbling thus created and applied to the predetermined frequency Fd (variation in the frequency Fd) makes it possible to sweep a large number of frequencies between 60 Hz and 90 Hz, of which some are more effective for assisting with reading. The more effective frequencies vary according to the dyslexic subject. By sweeping all the frequencies between 60 and 90 Hz, the device of the invention does not require any prior adjusting and becomes effective for a large number of users. This phenomenon of wobbling thus makes it possible and in certain cases, to further reduce the annoyances linked to dyslexic disorders.

The same advantage stems from the variations in the duration T1 of the display periods.

The invention is not limited to only the embodiments described hereinabove, but applies to any method for displaying a graphical content, comprising in particular text elements, implementing successive operations of displaying and non-displaying periodically of this graphical content, on a display device, according to successive cycles that take place at a predetermined frequency Fd such that the successive display periods T1 each have a duration comprised in an interval of values ranging from 15 to 30% of the duration T cycles that have taken place. The invention applies furthermore to any device implementing the aforementioned method.

The invention claimed is:
1. Method for improving the reading of a graphical content or a text content by a person subject to dyslexia, by displaying and inhibiting periodically said graphical content in a content playback device (DISP),
wherein said method comprises: an alternation of display periods, during which all or a portion of the graphical content is displayed, and periods of absence of display, during which the graphical content is not displayed, according to successive cycles that take place at a predetermined frequency Fd,
wherein each cycle has a duration (T) and comprises a display period of duration (T1) followed or preceded by a non-display period of duration (T2), said frequency (Fd) being defined by the relationship $Fd=1/(T1+T2)$, and in that the duration (T1) is comprised in an interval of values ranging from 15 to 30% of the duration (T) of said cycles, and in that the frequency (Fd) is comprised in an interval of values ranging from 60 to 90 Hz.

2. Method according to claim 1, wherein the frequency of the signal is equal to 70 Hz or 84 Hz and the duty cycle T1/(T1+T2) is equal to 20%.

3. Method according to claim 1, wherein the frequency (Fd) varies over time.

4. Method according to claim 3, wherein the predetermined frequency (Fd) is said to be wobbling taking advantage of the Hebbian mechanisms of the neurons of the cortex and varies by increasing in successive steps to a maximum value according to a first speed, referred to as the increase speed, then varies by decreasing in successive steps to a minimum value according to a second speed, referred to as the decrease speed, with the increasing and decreasing variations repeating iteratively over time.

5. Method according to claim 4 wherein said decrease speed is equal to said increase speed.

6. Method according to claim 5, wherein said successive steps are of equal duration.

7. Method according to claim 5, wherein said successive steps vary in duration in such a way that the value of said frequency (Fd) changes according to a triangle, saw-tooth or sinusoid waveform between said maximum value and said minimum value.

8. Method according to claim 1, wherein the duration (T1) of said display periods varies over time.

9. Method according to claim 1, wherein said display device is included in the list: playback screen, computer, tablet, touch tablet, telephone, smartphone, smart watch, digital book, guide or device for assistance in the circulation of vehicles or of pedestrians.

10. Method according to claim 1, wherein said predetermined frequency (Fd) is defined by a user.

* * * * *